United States Patent
Cottrell

(10) Patent No.: US 7,304,746 B2
(45) Date of Patent: *Dec. 4, 2007

(54) COMMON-PATH POINT-DIFFRACTION PHASE-SHIFTING INTERFEROMETER

(75) Inventor: William J. Cottrell, Essex Junction, VT (US)

(73) Assignee: Interphase Technologies, Inc, Essex Junction, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 11/501,413

(22) Filed: Aug. 9, 2006

(65) Prior Publication Data

US 2006/0274321 A1    Dec. 7, 2006

Related U.S. Application Data

(63) Continuation of application No. 10/146,156, filed on May 15, 2002, now Pat. No. 7,106,456.

(60) Provisional application No. 60/347,160, filed on Jan. 9, 2002.

(51) Int. Cl.
*G01B 9/02*    (2006.01)

(52) U.S. Cl. ..................... 356/495; 356/521

(58) Field of Classification Search ................ 356/453, 356/455, 477, 484, 491, 499, 515, 521
See application file for complete search history.

(56) References Cited

U.S. PATENT DOCUMENTS

| | | | | |
|---|---|---|---|---|
| 4,575,247 A | * | 3/1986 | Tansey | 356/484 |
| 4,762,417 A | * | 8/1988 | Wu et al. | 356/477 |
| 6,304,330 B1 | * | 10/2001 | Millerd et al. | 356/521 |
| 7,106,456 B1 | * | 9/2006 | Cottrell | 356/521 |
| 2005/0046863 A1 | * | 3/2005 | Millerd et al. | 356/495 |

* cited by examiner

*Primary Examiner*—Michael A. Lyons
(74) *Attorney, Agent, or Firm*—Thomas G. Ference

(57) ABSTRACT

A common-path, point-diffraction, phase-shifting interferometer uses a half wave plate having a diffractive element, such as pin hole. A coherent, polarized light source simultaneously generates a reference beam from the diffractive element and an object beam from remaining portions of the light going through the half wave plate. The reference beam has a nearly spherical wavefront. Each of the two beams possesses a different polarization state. The object and reference beams are then independently phase modulated by a polarization sensitive phase modulator that shifts phase an amount depending on applied voltage and depending on polarization state of the incident light. A polarizer is then used to provide the object and reference beams in the same polarization state with equal intensities so they can interfere to create an interferogram with near unity contrast.

38 Claims, 11 Drawing Sheets

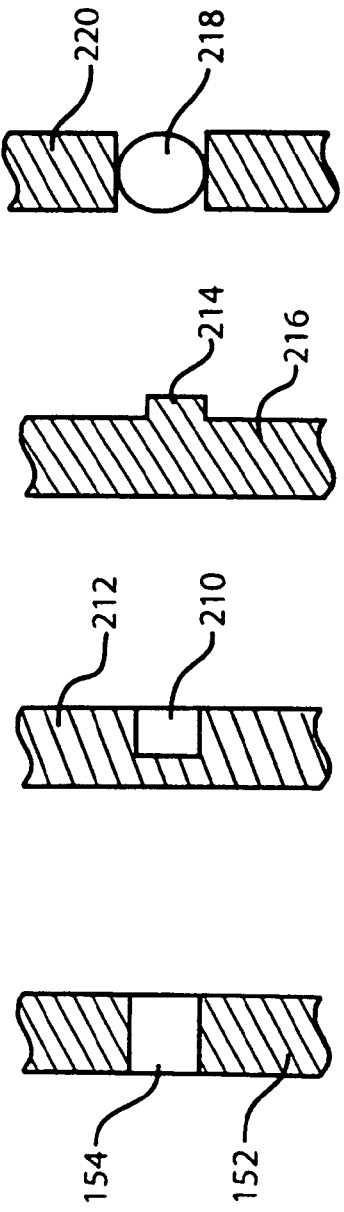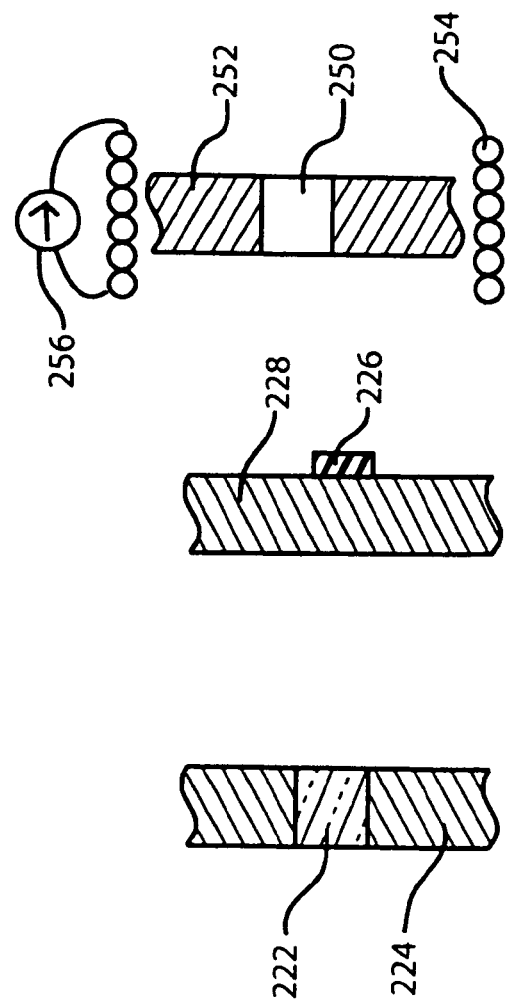
FIG. 8a  FIG. 8b  FIG. 8c  FIG. 8d
FIG. 8e  FIG. 8f  FIG. 8g

COMMON-PATH POINT-DIFFRACTION PHASE-SHIFTING INTERFEROMETER

RELATED APPLICATIONS

This application claims the benefit of and is a continuation of U.S. Utility patent application Ser. No. 10/146,156, filed May 15, 2002, now U.S. Pat. No. 7,106,456 which claims the benefit of Provisional Application Ser. No. 60/347,160, filed Jan. 9, 2002, both entitled "Common-Path Point-Diffraction Phase-Shifting Interferometer", both herein incorporated by reference.

FIELD OF THE INVENTION

This invention relates generally to interferometry. More specifically, it relates to a common-path interferometer. Even more specifically, it relates to a common-path, phase-shifting interferometer.

BACKGROUND OF THE INVENTION

Interferometers are widely used for characterizing optical elements and systems. Two-beam interferometers split a single coherent optical beam into two beams that travel along separate paths. One beam is used as an object beam that is altered by the test element or system. The other beam is used as a reference beam, which is not transmitted through the system, and retains its original wavefront shape. Recombining the two beams creates an intensity pattern (interferogram) resulting from constructive and destructive superposition of the beams. This interferogram can be analyzed to determine information about the element or system in test. However, such two-beam interferometers are difficult to align and environmentally unstable.

Phase-shifting interferometers shift the phase between the object and reference beams to provide more information about the properties of the optical element or system. As more fully described in a paper, "Phase-Shifting Scatterplate Interferometer," by North-Morris et al., Advanced Optical Manufacturing and Testing Technology, Proceedings of SPIE, Vol. 4231, pp. 59-65, 2000, ("the North-Morris paper") in phase shifting interferometry a series of interferograms are recorded while the reference phase is changed. Alternatively, the object phase may be changed. The resulting changes in the interferogram can be used to better characterize the object beam and therefore the system from which it originated. However, generating the phase shift usually adds a level of complexity to the interferometer system.

In common-path interferometers the object and reference beams travel along a common path. When the two beams travel along the same path the interferometer is more environmentally stable because vibration, thermal effects, noise, and other limiting environmental factors are the same for the two beams. Introducing phase shifts between coincident object and reference beams, however, has been difficult because of the need to optically distinguish between the two beams traveling along the same path.

Point diffraction interferometers (PDI) are a kind of common-path interferometer, as described in an article, "Point-Diffraction Interferometer," by R. N. Smartt and J. Strong, Journal of the Optical Society of America, 62, p. 737, (1972). The Smartt et al. PDI is illustrated in FIGS. 1a and 1b. Transparent substrate 10 is coated with semi-transparent coating 12 except for pinhole-sized region 14 that is left uncoated. Pinhole-sized region 14 is on the order of a few microns in diameter and is circular in shape. Uncoated pin-hole sized region 14 acts as a diffractive feature, similar to a pinhole aperture. The beam under test 16 is brought to a focus 18 using lens 20 at a position near the diffractive feature, pin-hole sized region 14. A portion of beam 16 is thereby transmitted though the diffractive feature, pin-hole sized region 14 and generates a substantially spherical wavefront for reference beam 22, in accordance with Huygens' Principle. The remaining portion of impinging beam 16 under test is transmitted through coated substrate 10 in the region adjacent pinhole-sized region 14, retaining the original wavefront shape of beam under test 16, but attenuated by semi-transparent coating 12. This remaining portion becomes object beam 24. Object beam 24 and reference beam 22 now travel along the same path, or in coincidence. In accordance with the principle of superposition, object beam 24 and reference beam 22, now produce an intensity pattern 26 resulting from constructive and destructive interference of the beams. The interfering beams are then imaged onto image plane 28 with lens 30. In order to form interferograms with maximized contrast it is important to have the individual intensities of reference beam 22 and object beams 24 nearly equal. Therefore, the amount of attenuation that is introduced by semi-transparent coating 12 is often tailored so that each beam has nearly equal intensity.

Diffraction provides a nearly perfect spherical beam, and the diffractive feature pinhole-sized region 14, allows for the creation of a spherical reference beam exceeding the accuracy available from a two-beam interferometer. In order to form the best spherical beam for the reference beam, C. Kiliopoulous et al. showed that pinhole-sized region 14 should have a dimension less than the diameter of the spot formed, airy disk, from focused beam 16, as described in a paper, "Infrared Point-Diffraction Interferometer," Optical Letters 3, pp. 118-120, (1978).

Improving on the PDI, Mercer developed a liquid crystal point-diffraction interferometer (LCPDI), as described in U.S. Pat. No. 5,689,314 ("the '314 patent", and as shown in FIGS. 2a and 2b. The LCPDI uses the phase shifting properties of liquid crystal cells. This interferometer employs optical beam 40 that is polarized by linear polarizer 42. Lens 44 images the optical beam onto focal point 46 adjacent to liquid crystal cell 48. The latter consists of glass microsphere 50 within layer of liquid crystals 52 that is sandwiched between glass substrates 54a, 54b with transparent conductive coatings 56a, 56b (see FIG. 2b). Optical properties of liquid crystal layer 52 are controlled by voltage source 58 applied across transparent conductive coatings 56a, 56b. The portion of optical beam 40 traveling through microsphere 50 creates a reference beam 60 with a substantially spherical wavefront, while the remainder of optical beam 40 is transmitted through layer of liquid crystals 52 adjacent microsphere 50 as object beam 62. Application of a voltage to liquid crystal cell 48 creates an electric field within liquid crystal layer 52. This electric field orients the liquid crystal molecules such that the optical path of object beam 62 is altered, shifting the phase of object beam 62 with respect to reference beam 60 whose optical path is unaffected by the voltage. Reference beam 60 undergoes no phase shifting, as it never travels through liquid crystal layer 52. Interfering reference beam 60 and object beam 62 are then imaged using lens 64 onto image plane 66 where they form interferogram 68.

One limitation of the device of the '314 patent arises from local distortion of the liquid crystals due to molecular anchoring affects at the surface of microsphere 50. Another limitation is that dyes must be added to liquid crystals 52 in order to attenuate intensity of object beam 62. Modulation of liquid crystal layer 52 changes the orientation of the dye molecules, which changes their attenuation. The saturation limit of this dye mixture also limits how thin liquid crystal cell 48 can be manufactured, and this limits the speed at which the phase relationship between reference beam 60 and object beam 62 can be modulated, limiting its use in fast changing dynamic systems. The complex diffractive structure created by microsphere 50 embedded in liquid crystals is likely to cause distortion in reference beam 60, limiting how close to a perfect spherical wavefront it can produce.

Polarization techniques have been used to optically distinguish between the object and reference beams. In U.S. Pat. No. 5,933,236, Sommargren uses a half wave retardation plate to produce two orthogonally polarized beams which are then split by a polarization beam splitter so the horizontal polarization is transmitted while the vertical polarization is reflected so the two beams travel along the two arms of a two-beam interferometer.

The North-Morris paper discusses the use of polarization in conjunction with a quarter wave plate with scattering features in order to form phase-shifted interferograms in a common-path interferometer, as shown in FIG. 3. This interferometer includes source of light 80 which is focused by lens 82 and reflected from mirror 84 onto ground glass plate 86, which is used to reduce speckle, as shown in FIG. 3. Light transmitted through ground glass plate 86 is then transmitted through lens 88, polarizer 90 and liquid crystal phase modulator 92. The light is then reflected with beam splitter 94 through scatter plate 96 and calcite quarter wave plate 98. Portion 100 of the light from calcite quarter wave plate 98 is transmitted and comes to focus 102 on test mirror 104. The remainder of light from calcite quarter wave plate 98 is scattered 106 and is reflected off test mirror 104. Beam 100 and beam 106 are reflected by test mirror 104 back through quarter wave plate 98, scatterplate 96 and beam splitter 94. Lens 108 is used to direct the reflected beams through analyzer 110 and image the resulting interferogram onto CCD array 112. This interferometer is limited to the testing of mirror 104 from which beams 100 and 106 are both reflected. In addition, the double-pass nature of the interferometer creates a "hot spot" in the center of the interferogram, which does not allow all of the interferogram to be used in gathering test system data. Furthermore, the light that is scattered by both the first and the second passes of the scatterplate contributes to background noise in the interferogram.

As noted above, current common-path, phase-shifting interferometers each suffer from deficiencies that limit their use and functionality. Thus, a better system for phase-shifting, common-path interferometers is needed that is diverse in application, can provide nearly perfect reference beams, and can provide interferograms with unity contrast.

SUMMARY OF THE INVENTION

One aspect of the present invention is accomplished by an optical component for analyzing incident light. The optical component includes an element having a single first region and a second region. The single first region is for diffracting light that is incident thereon. The second region is adjacent the first region. The first and said second regions are designed so that the polarization state of light emerging from the second region is different from the polarization state of light emerging from the first region.

Another aspect the invention is an optical component for use with electromagnetic radiation of a particular range of wavelengths for use in creating an intended optical function. The optical component includes a half wave plate having a diffractive element for providing the intended optical function for the particular range of wavelengths.

Another aspect the invention is an optical component that includes a birefringent plate that has a single diffractive element and a region of the birefringent plate that is adjacent the single diffractive element. The single diffractive element and the region adjacent the single diffractive element are designed so that light emerging from the single diffractive element is polarized orthogonally to light emerging from the region adjacent the single diffractive element.

BRIEF DESCRIPTION OF DRAWINGS

The foregoing and other aspects and advantages of the invention will be apparent from the following detailed description of the invention, as illustrated in the accompanying drawings, in which:

FIG. 1a is a schematic diagram of a prior art point-diffraction interferometer;

FIG. 1b shows a cross sectional view of the diffractive feature of FIG. 1a;

FIG. 2a is a schematic diagram of a prior art liquid crystal point-diffraction interferometer;

FIG. 2b shows a magnified cross sectional view of the diffractive feature in FIG. 2a;

FIG. 5a is a perspective view of the invention of FIG. 4 further illustrating elements of the system and the interferogram;

FIG. 5b is a cross-sectional view of the invention further illustrating the diffractive feature in FIG. 5a.

FIG. 7 is a perspective view of the invention of FIG. 4 further illustrating the polarization states of the object and reference beams traveling there through;

FIGS. 8a-8g are cross sectional diagrams of different diffractive elements that may be used to generate the reference beam in a common-path, point-diffraction, phase-shifting interferometer of the present invention;

DETAILED DESCRIPTION OF THE INVENTION

Figure 1:
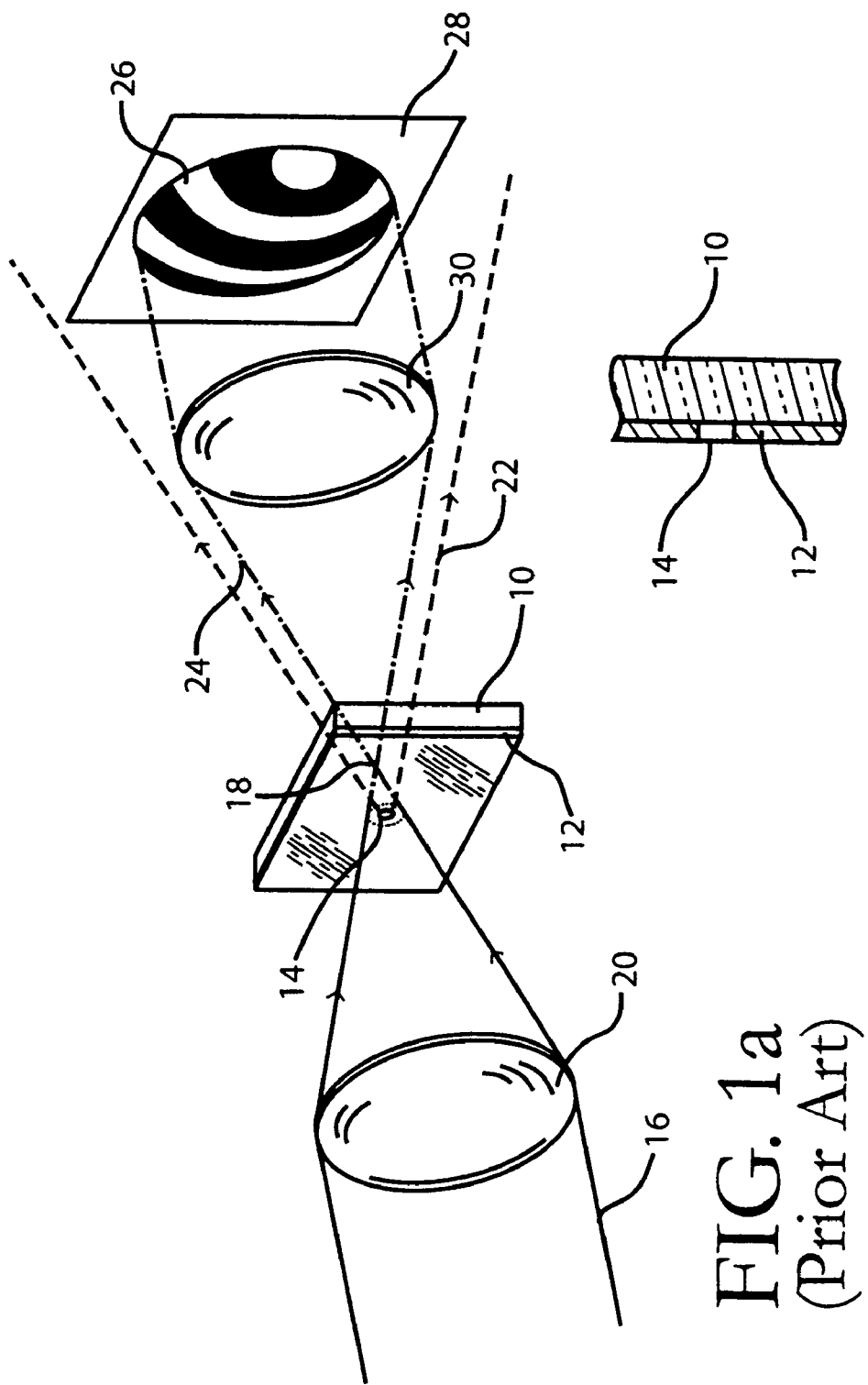
Figure 2:
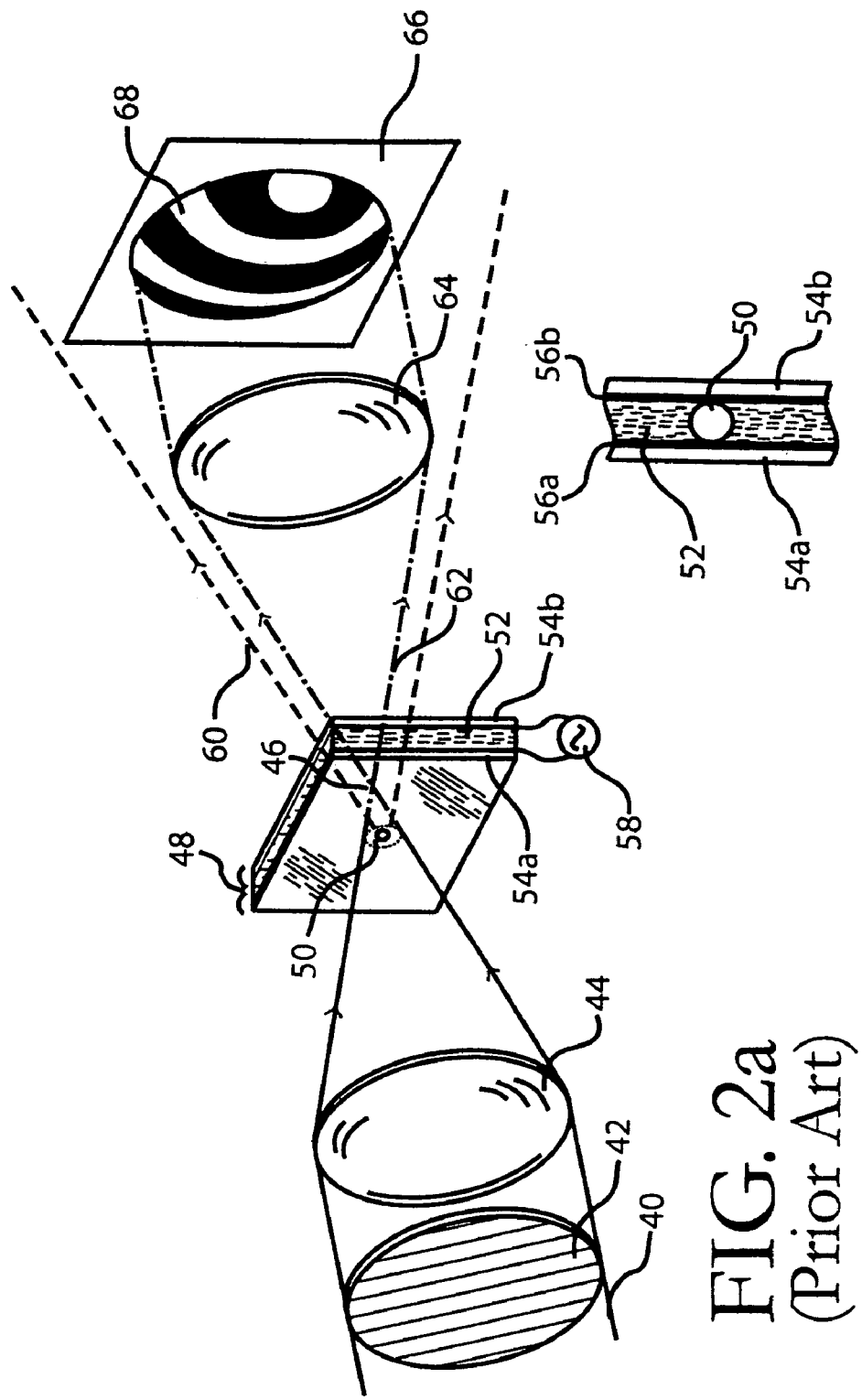
Figure 3:
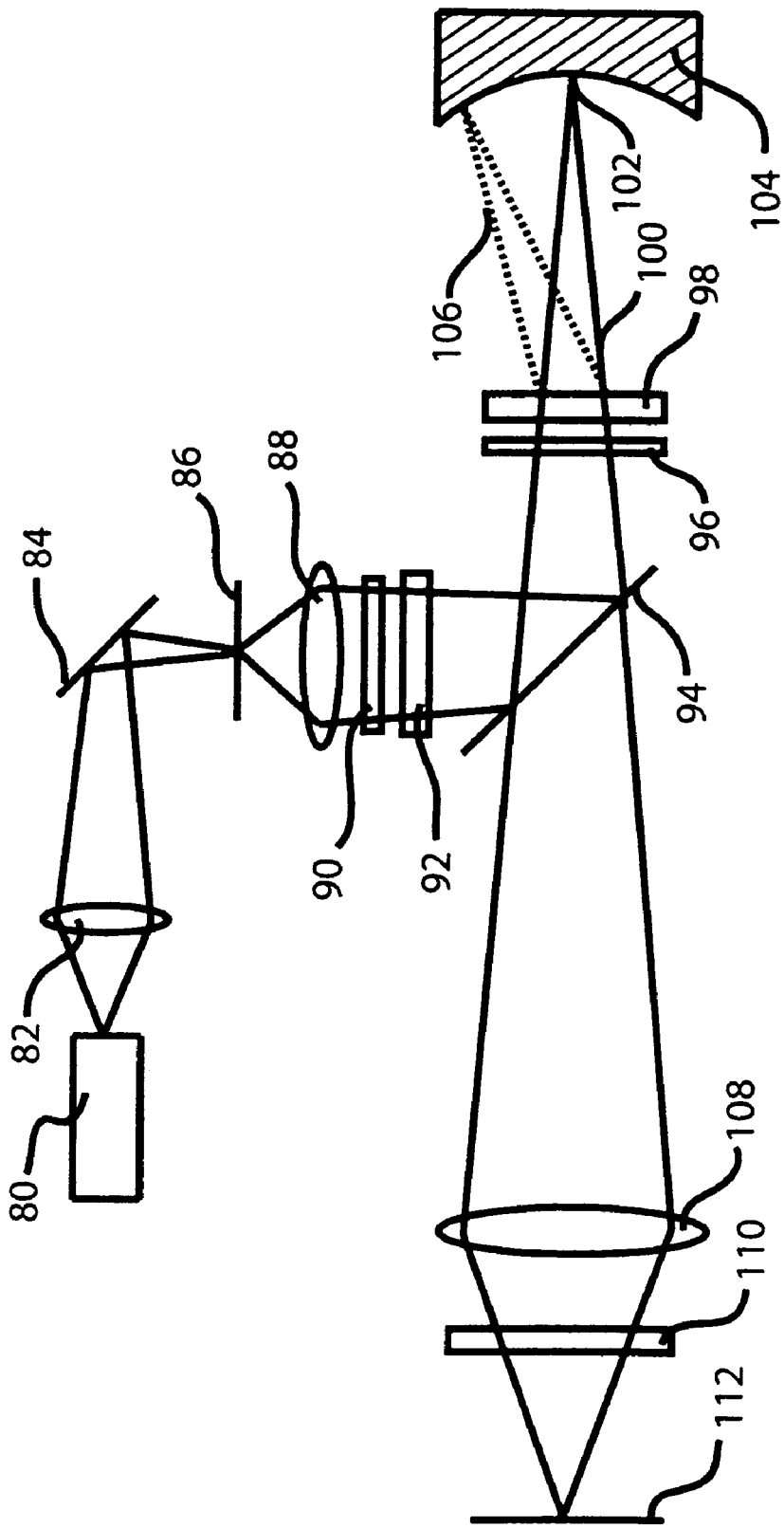
FIG. 3 is a schematic diagram of a prior art common-path, phase-shifting interferometer that uses polarization techniques to distinguish between object and reference beams.

The present invention provides an improved common-path, phase-shifting interferometer. A diffractive element, such as a pin-hole, is embedded within a polarization element, which may be a birefringent material, to provide two differently polarized beams from an incident beam, one from the diffractive element and the other from the polarization element that surrounds the diffractive element. Nearly perfectly spherical wavefronts emerge from the diffractive element to provide a reference beam for the later analysis. An object beam that carries very much the same information as the incident beam emerges from the polarization element surrounding the diffractive element. However, the polarization element imparts a change in the polarization state to the incident beam traveling there through. In one embodiment of the invention, this change in polarization state is 90° so that the two beams are polarized perpendicularly with respect to each other. However, other angular relationships in polarization state of the two beams are encompassed by the present invention. If perpendicularly polarized, the two beams cannot interfere with each other at this point. Thus, when an incident beam impinges on the polarization element with its embedded diffractive element, two beams emerge, one with nearly a perfect spherical wavefront of a first polarization state and the other having the information of the incident beam with a polarization shifted 90° from that of the incident beam.

The two beams having different polarization states travel along the same path to a phase modulator which provides a shift in phase as a function of polarization state of an incoming beam. Thus, it may shift the phase of only one of the two incoming beams, leaving the phase of the other beam unchanged. Phase modulation can be used to provide different information encoded in the incident beam. Phase modulation can be sequentially adjusted to provide a series of interferograms for analysis.

The two beams having different polarization states and shifted phase continue to travel along the same path to a polarization filter that allows some of each of the two beams to pass and combines them into the same polarization state so they can now interfere with each other providing an interferogram on a screen or on an electronic detector, such as a charge coupled device (CCD). Information from the CCD is transmitted to a computer for analysis. The computer can provide feedback to the phase modulator to repeat the analysis with different phase. Feedback from the computer can also be provided to adjust the polarization filter so intensity of the two interfering beams can be better matched to improve contrast of the interferogram. Computer feedback can also be provided to adjust the various other optical elements in the system.

Describing the invention in more detail, light source 130 generates coherent optical beam 132 that is directed through spatial filter 134, as shown in FIG. 4a, FIG. 4b, and FIGS. 5-7. Light source 130 is spatially coherent and may, for example, be a mercury lamp with a spatial filter or a laser, such as a gas laser, diode laser, or fiber laser. Collimating lens 136 produces a collimated coherent beam 138. Collimated beam 138 is then directed through optical test system 140 that is the subject of the optical analysis.

Figure 6:
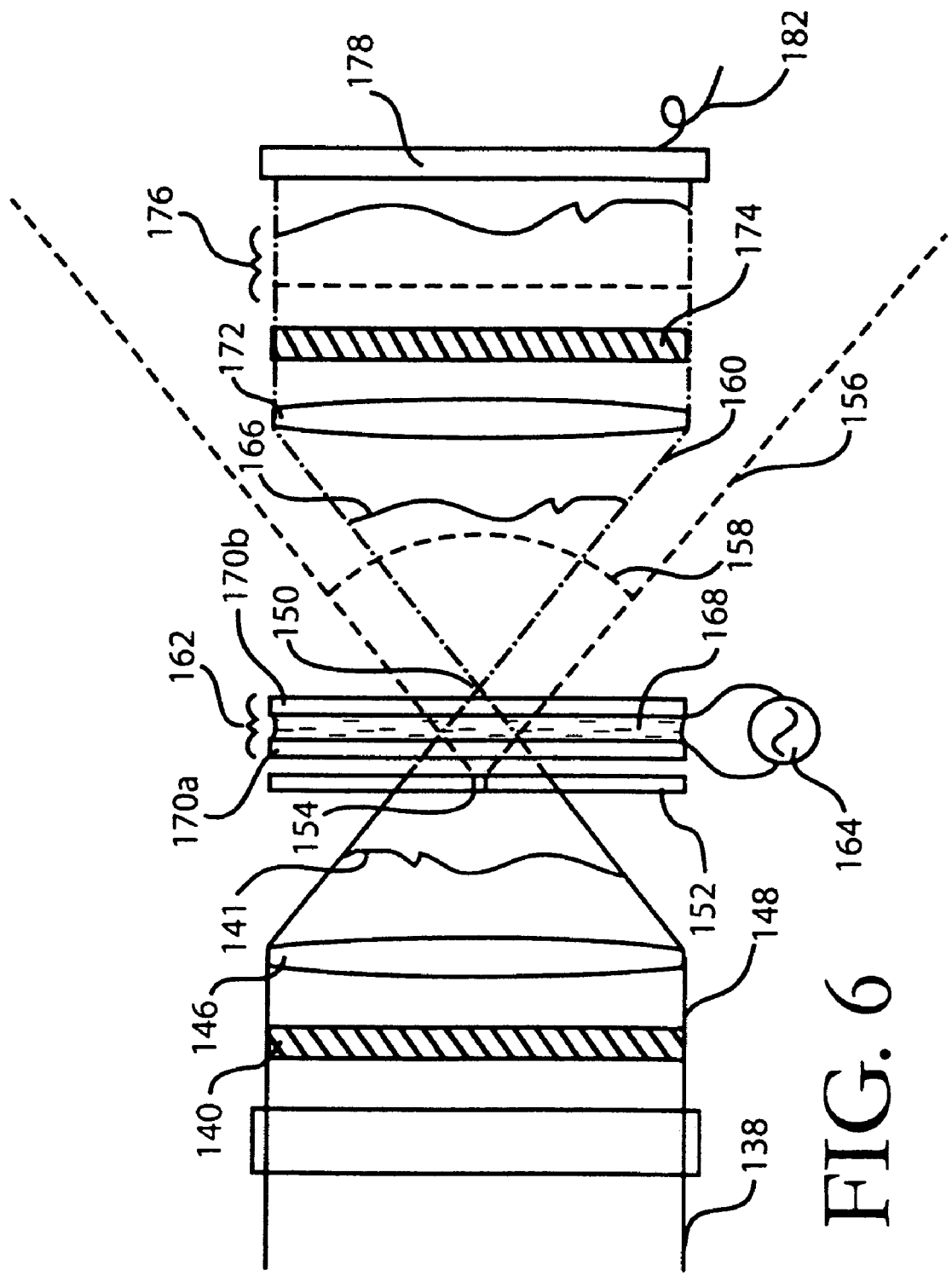
FIG. 6 is a cross sectional view of the invention of FIG. 4 showing a spherical reference wavefront emerging from the diffractive element and showing an object wavefront emerging from the wave plate adjacent the pinhole carrying information from the system under test.

Test system 140 may comprise a single lens, a mirror, an optical flat, a series of lenses and mirrors, a dynamic fluid system, or any other system that one may wish to inspect or characterize through interferometry. Test system 140 changes wavefront 141 of collimated coherent beam 138, encoding this beam with information about the test system, as shown in FIG. 6. Test beam 142 from the test system is then transmitted through linear polarizer 144, which serves to define a polarization axis for the beam.

Imaging optics 146 are used to bring polarized incident beam 148 to a focal point 150 near modified half wave plate 152, oriented with its fast axis at 45° to the incident beam's polarization axis. Imaging optics 146 may comprise a lens, a mirror, or a combination thereof Wave plate 152 can be fabricated from a birefringent material, such as quartz, rutile, calcite, lithium niobate, or YVO4. Wave plate 152 may be linearly birefringent or elliptically birefringent. Wave plate 152 contains a diffractive element, such as a pinhole aperture 154 through the thickness of wave plate 152. Focal point 150 is near pinhole aperture 154. A portion of incident beam 148 focused near pinhole 154 is transmitted through pinhole aperture 154, and this portion is diffracted as reference beam 156 with spherical wavefront 158. Reference beam 156 retains the polarization state of incident beam 148 since pinhole aperture 154 does not effect its polarization state. The remainder of incident beam 148 adjacent pinhole aperture 154 is transmitted through the portion of half wave plate 152 surrounding pinhole aperture 154. This part of incident beam 148 becomes object beam 160 and carries the same information about the test system as that of incident beam 148. Object beam 160 has its polarization axis rotated by half wave plate 152 90° relative to the polarization axis of incident beam 148. The wavefront 166 of the object beam 160 is inverted relative to the wavefront 141 of the incident beam 148. The polarization axes for object beam 160 and reference beam 156 are now therefore orthogonal.

Object beam 160 and reference beam 156 now both pass through a polarization sensitive anisotropic phase modulator, such as liquid crystal cell 162. The present invention includes polarization sensitive phase modulators other than liquid crystal cell 162, some of which are described below and illustrated in FIGS. 9a-9e. The phase modulator of the present invention may be a longitudinal modulator, a transverse modulator or a traveling wave modulator. Thus, the following description of liquid crystal cell 162 is intended, to the extent pertinent, to apply to the cell itself, and more generally to all polarization sensitive phase modulators encompassed by the present invention. Liquid crystal cell 162 is aligned so that the long axes of the liquid crystals in liquid crystal cell 162 are parallel to the polarization axis of reference beam 156 and orthogonal to the polarization axis of object beam 160. Liquid crystal cell 162 can be a nematic liquid crystal variable retarder such as those available from Meadowlark Optics in Longmont, Colorado. This allows voltage source 164 to control the phase of reference wavefront 158 while leaving object wavefront 166 unaffected. In this way, wavefronts 158 and 166 can be modulated dissimilarly with applied voltage to liquid crystal cell 162.

Liquid crystal cell 162 contains a nematic liquid crystal layer 168 sandwiched between transparent substrates 170a and 170b coated with transparent conductors 171a and 171b and connected to a voltage source 164. Liquid crystal cell 162 is oriented so that the long axes of the liquid crystals in layer 168 are parallel to the polarization axis of reference beam 156 and perpendicular to the polarization axis of object beam 160. By applying a voltage to conductive coatings 171a, 171b, on substrates 170a, 170b, an electric field is generated in liquid crystal layer 168. The liquid crystal molecules tend to orient themselves parallel to the electric field lines. This changes the optical properties of the material for light polarized along the long axes of the liquid crystals but not for the light perpendicular to the axes. In this way, voltage applied to the cell will change the optical path as seen by reference beam 156, but not as seen by object beam 160. This allows phase shifting of reference beam 156 relative to the phase of object beam 160.

Alternatively, liquid crystal cell 162 can be oriented so that the long axes of the liquid crystals in layer 168 are parallel to the polarization axis of object beam 160 and perpendicular to the polarization axis of reference beam 156 to provide the relative phase shifting. Reference beam 156 and object beam 160 then both pass through imaging optics 172, which may consist of a lens, a mirror, or any combinations thereof. Object beam 160 and reference beam 156 then pass through second linear polarizer 174. Linear polarizer 174 serves two functions. First, linear polarizer 174 forces both beams to have the same polarization axis. Second, linear polarizer 174 is oriented so that its polarization axis is at an angle relative to the axes of object beam 160 and reference beam 156 so that the intensity of each of the two beams is made equal when transmitted through polarizer 174.

Interfering beams 176 (FIG. 6) are then directed onto a CCD detector 178 on which they form interferogram 180. Providing object beam 160 and reference beam 156 with nearly identical polarization states and intensity allows near unity contrast in interferogram 180. Interferogram 180 is detected using CCD detector 178 and information about interferogram 180 is directed from CCD detector 178 along path 182 to computer 184. Computer 184 includes software for controlling the manipulation of the data from the CCD in order to determine test system information. Computer 184 can also be used to control voltage source 164 by way of a feed back system 186, which in turn changes the phase relationship in the interferogram. Zygo Corporation's "Metro Pro," Phase Shift Technology's "Optic Code Analysis Software," and WYKO Corporation's "WISP" can provide software for these tasks.

Figure 7:
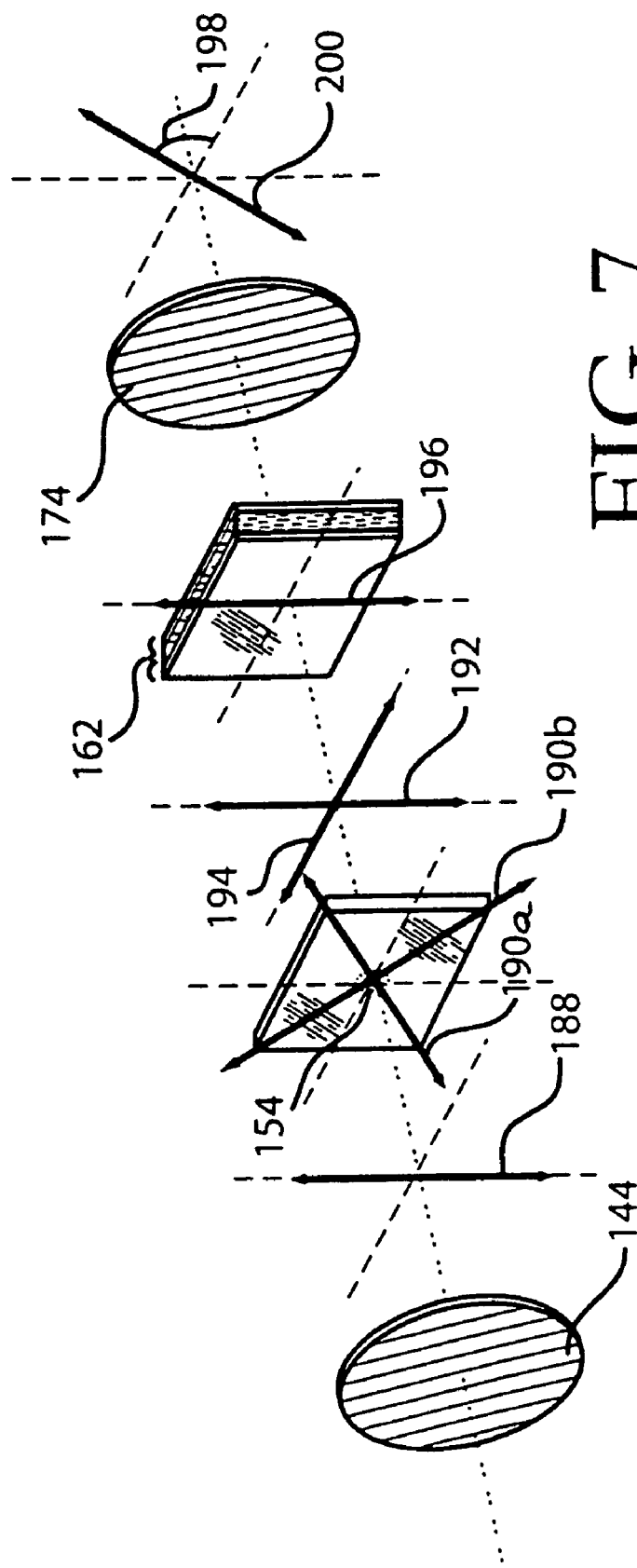

FIG. 7 shows polarization state of light as it travels through the system of the present invention in more detail. Beam 142 from test system 140 is transmitted through linear polarizer 144, providing incident beam 148 with linear polarization along vertical polarization axis 188 as shown in FIG. 7.

Incident beam 148 now impinges on modified half wave plate 152 and pinhole 154 that is within a portion of the plate. The portion of incident beam 148 diffracted from pinhole 154 becomes reference beam 156. Reference beam 156 is composed of nearly perfectly spherical waves that are linearly polarized with polarization axis 192 vertical, parallel to the polarization axis of incident beam 148.

The remaining portion of incident beam 148 transmitted through half wave plate 152 outside the range of pinhole 154 provides object beam 160 with linear polarization along polarization axis 194 rotated 90° from polarization axis 188 of incident beam 141, so it is now horizontal.

Half wave plate 152 is fabricated of a material that has different indices of refraction along orthogonal axes 190a, 190b so the optical path length experienced by light having a polarization along one axis is greater than that having a polarization along the other axis. A beam having a linear polarization oriented at 45° to these two axes has its polarization state changed as it travels through the plate. A plate having an appropriate thickness for the wavelength of light used rotates the polarization vector through a 90° angle with respect to polarization axis 188 of incident beam 148. Thus, object beam 160 emerging from half wave plate 152 is linearly polarized along horizontal axis 194. Half wave plate 152 provides the 90° rotation for only a range of wavelengths. Preferably light source 130 is a monochromatic coherent light source.

Liquid crystal cell 162 has its liquid crystal molecules in layer 168 oriented along either the vertical or the horizontal direction, corresponding to polarization axes 192 or 194. Reference beams 156 and object beam 160 traveling through liquid crystal cell 162 will then retain their orthogonal polarization states. However, only the light having its polarization axis along the direction of the long axis of the liquid crystal molecules has its phase changed. So if axis 196 (FIG. 7) of liquid crystal cell 162 is parallel to polarization axis 192 of reference beam 156, there will be phase modulation of reference beam 156, while object beam 160 will retain its original phase. Voltages are applied to electrodes connected to liquid crystal layer 168 to provide an electric field across the layer to provide this phase modulation to reference beam 156. The analysis of test system 140 is repeated for various voltages and various phases. Similarly, by rotating liquid crystal cell 162 90° phase modulation can be provided for object beam 160.

After emerging from liquid crystal cell 162, object beam 160 and reference beam 156 are then transmitted through second linear polarizer 174 which is oriented at an angle 198 to polarization axis 194 to provide that only a portion of the object and reference beams penetrate to provide beams that are both linearly polarized along polarization axis 200 of linear polarizer 174. The orientation of polarizer 174 is adjusted to provide equal transmitted intensities of object beam 160 and reference beam 156.

Various diffractive structures can be used to generate reference beam 156, as shown in FIGS. 8a-8g, including pinhole aperture 154 within modified half wave plate 152 of FIG. 8a, and flat-bottomed well 210 of FIG. 8b. The depth of well 210 is selected so that the relative rotation of beams traveling in well 210 compared to beams traveling outside well 210 and in plate 212 is still 90°. The diffractive feature can also be column 214, as shown in FIG. 8c. The thickness of column 214 is selected so that it is as thick as a single order or multiple order half wave plate of the same material comprising half wave plate 216 so that relative rotation is 90°. The lens or sphere 218 in plate 220 can also be used to provide the diffractive element, as shown in FIG. 8d. A lens or sphere may enhance the generation of a reference wave. Second embedded material 222 can be embedded in birefringent plate 224. Embedded material 222 is dielectric and non-birefringent, such as glass, so as not to change polarization state of light passing there through as shown in FIG. 8e. The embedded material can be in the shape of a sphere or a column. The diffractive element can also be column 226 protruding from plate 228, in which the material comprising column 226 is a birefringent material dissimilar from the material forming half wave plate 228 as shown in FIG. 8f. The thickness of the birefringent column is selected so that the column acts as an independent half wave plate. In this way, light traveling through wave plate 228 will undergo a net polarization axis rotation of 90°. Light traveling through wave plate 228 and column 226 will undergo a net polarization rotation of 180°, so there is a net 90° rotation there between. In this case the plate need not be a half wave plate so long as there is a net 90° rotation between the two beams. In a variation of this structure, plate 228 could consist of a non-birefringent material where column 226 is a half wave plate.

Alternatively, plate 224 of FIG. 8e can be a polarizing film, and embedded material 222 can be a second polarizing film with its polarization axis oriented 90° thereto. If incident beam 148 is oriented with its polarization vector at a 45° angle to each of these axes it will be split into two beams with orthogonal polarization orientations.

A tunable polarization shifter with an embedded diffractive element is provided with pinhole 250 in magneto-optical material 252, as shown in FIG. 8g. Reference beam 156 traveling through pinhole 250 passes without rotation of its polarization axis while light penetrating magneto-optical material 252 has its polarization vector rotated through a controllable angle, such as 90°. The rotation can be adjusted by varying current to solenoid 254 with current source 256. Varying the magnetic field within magneto-optical material 252 varies the amount of rotation light experiences as it passes there through. Those skilled in the art will appreciate that other structures and devices may be used as the diffractive structure that generates reference beam 156.

Different interferograms of a test system will be obtained for different phase differences provided between reference and object beams, as is well known in the art. More information about the test system can be obtained by repeating the measurement to collect different interferograms with different amounts of phase difference provided between the reference and object beams. Similarly, different interferograms may be obtained while providing light to different portions of the test system. And different interferograms could be obtained while providing light to the test system at different times. Obtaining the various interferograms with variation in phase, space, and time, may be particularly valuable in the case of systems changing rapidly with position and with time, such as air flowing over a wing in a wind tunnel or exhaust from an engine. Thus, the speed at which a phase modulator can be varied is an important element of the analysis.

The speed at which the phase-shifting of the interferogram can be accomplished is limited by the speed of the phase modulator. In the case of liquid crystals, making liquid crystal layer 168 thinner increases this speed. Liquid crystal modulation speeds are typically limited to between 10 kilohertz and 1 megahertz.

Phase modulators other than liquid crystal cell 162, such as those shown in FIGS. 9a-9e, may be used in place of the cell. These alternative modulators offer higher speed modulation, at greater than one megahertz to tens of megahertz or hundreds of megahertz to as high as several gigahertz. This permits faster analysis of test systems, thereby improving the ability to measure high-speed dynamic systems. The speed at which an electro-optic modulator operates is limited by electrical capacitive effects and by the transit time of light through the system.

Figure 9C:
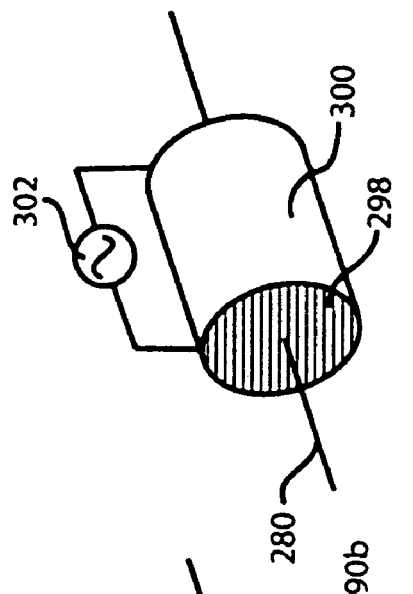
FIGS. 9a-9e are schematic diagrams of modulation elements that may be used to introduce phase shift between object and reference beams having different polarizations at higher speed than is possible with liquid crystal.
Figure 9B:
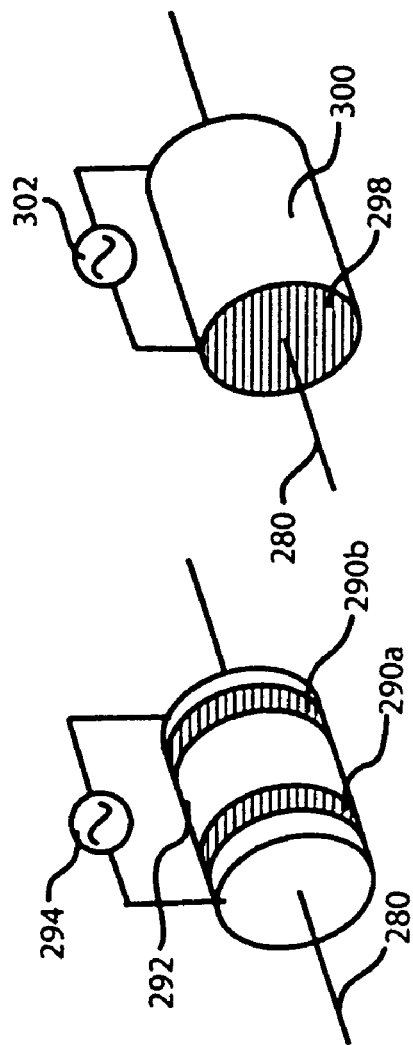
Figure 9A:
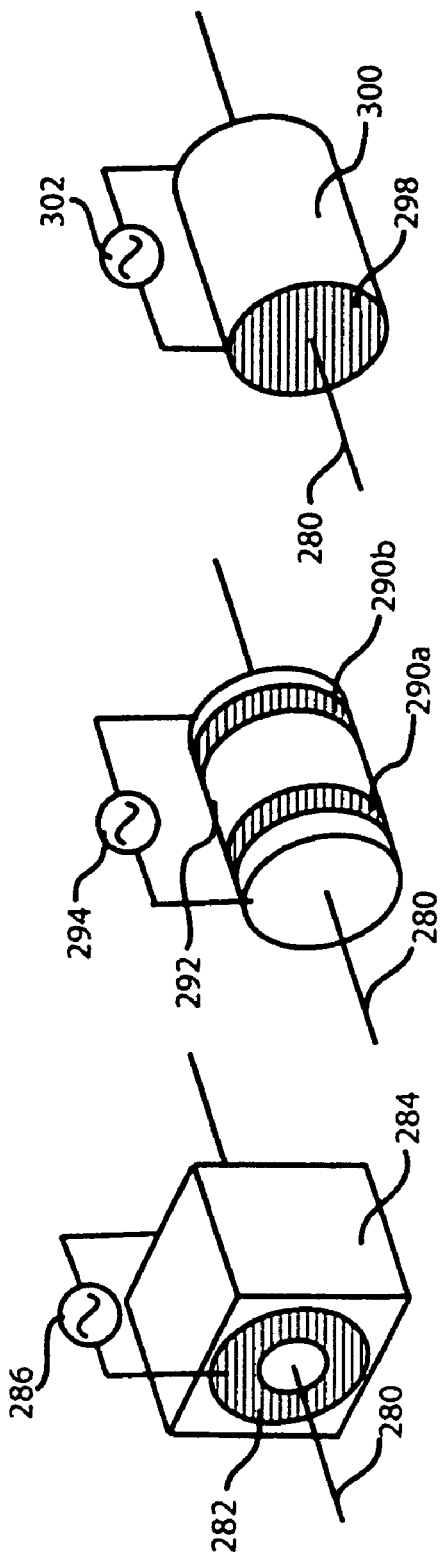

The phase modulators shown in FIGS. 9a-9e all use anisotropic birefringent materials, such as LiNbO3, LiTaO, KDP, ADP, GaAs, CdTe, InAs, and liquid crystals, such as Merck E7. Longitudinal electro-optic phase modulators are shown in FIGS. 9a-9c, which all have the electric field along the optical axes. FIG. 9a shows a modulator which has optical axis 280 along which optical beams will pass. Conductive washer 282 and a corresponding conductive washer on the opposite side of the device (not shown), provide the longitudinal field across electro-optic material 284. Voltage source 286 is used to generate the electric field that alters electro-optic material 284. FIG. 9b shows an electro-optic modulator that has conductive rings 290a, 290b to provide the longitudinal field across electro-optic material 292. Voltage source 294 is used to generate the electric field that alters electro-optic material 292. FIG. 9c shows an electro-optic modulator that has transparent conductive coating 298 and a corresponding transparent conductive coating (not shown) on the opposite side of the device to provide the longitudinal field that alters electro-optic material 300. Voltage source 302 is used to generate the electric field that alters electro-optic material 300.

Figure 9E:
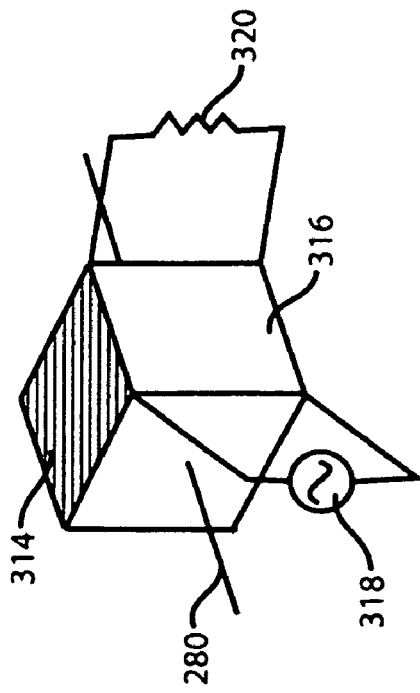
Figure 9D:
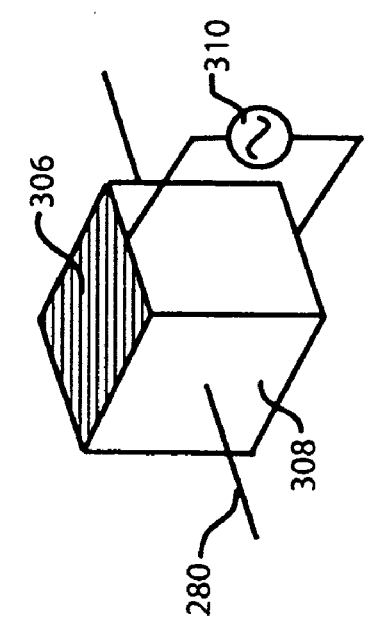

A transverse phase electro-optic modulator, shown in FIG. 9d, has the electric field perpendicular to optical axis 304 along which the optical beams will pass. Conductive top plate 306 and a corresponding conductive bottom plate (not shown) on the opposite side of the device, provide the field. Electro-optic material 308, and voltage source 310 that is used to generate the electric field that alters the electro-optic material providing the phase change to the light in an amount that varies with the field applied.

A traveling wave electro-optic modulator shown in FIG. 9e, has a conductive top plate 314 which has a corresponding bottom plate (not shown) on the opposite side of the device, electro-optic material 316, and voltage source 318 that is used to generate the electric field that alters the electro-optic material. As this is a traveling wave modulator, there is also a resistor 320 connecting the top and bottom plates.

Alternatives to the preferred embodiment can include interferometers in which the flat components of the system, such as the modified wave plate and the electro-optic phase modulator, are tilted so that they are not perpendicular to the optical axis of the system. This tilting can help to remove noise in the system by limiting reflections and etalon effects that may otherwise be experienced. In addition, antireflective coatings can be used on the components of the system to limit noise from reflections.

Figure 4A:
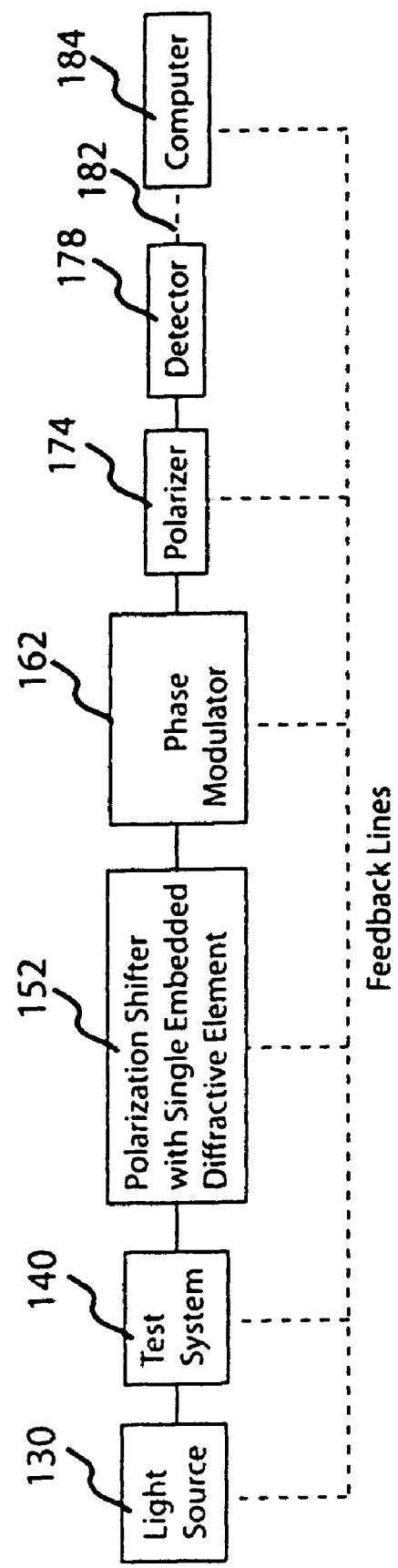
FIG. 4a is a block diagram of the system of the present invention.
Figure 4B:
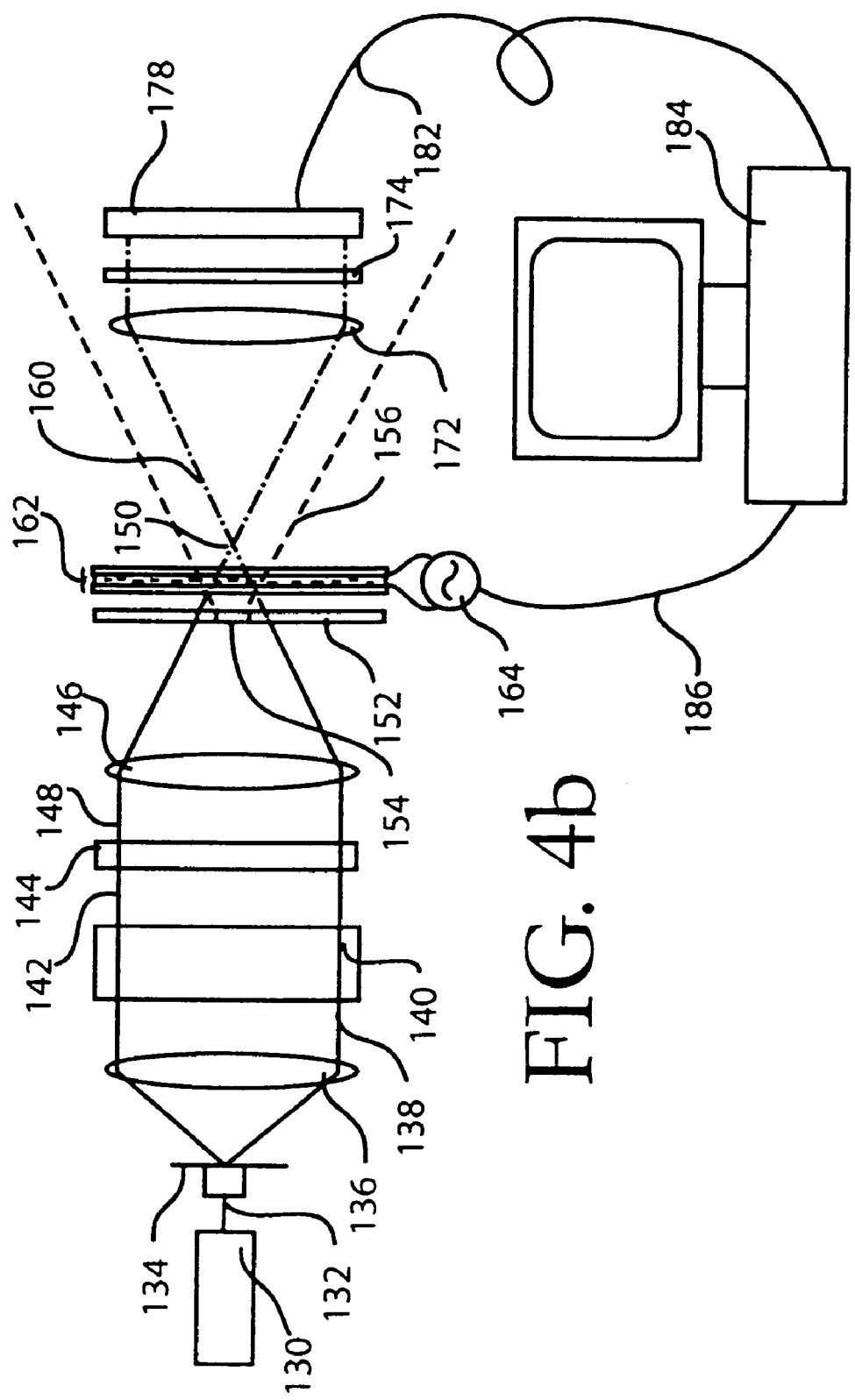
FIG. 4b is a schematic cross sectional view of the present invention in which a pinhole through a half wave plate simultaneously generates object and reference beams of different polarizations from a single incident beam, in which a polarization sensitive phase modulator provides phase separation there between, and in which a linear polarizer allows the object and reference beams to interfere to provide an interferogram on a light sensitive element for analysis in a computer which may provide feedback to the various components of the system.
Figures 5A, 5B:
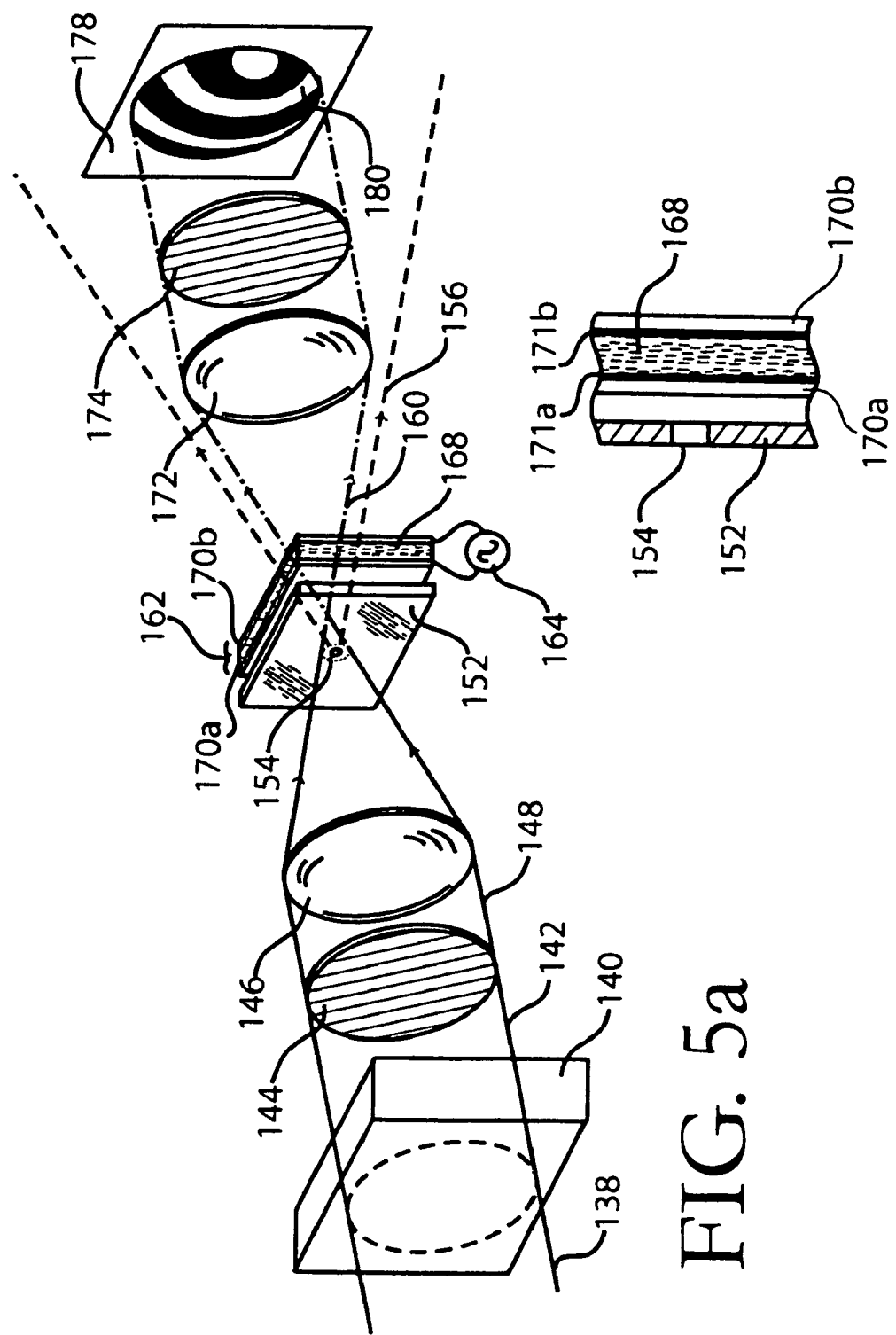

In addition to analyzing the data, computer 184 can also be used to control individual optical elements of the system, as shown in FIG. 4a. For example, computer 184 may be used to control the intensity of light source 130, the alignment of elements in test system 140, the amount of polarization shift introduced by polarization shifter 152, the amount of phase difference introduced by phase modulator 162, and the orientation angle of polarizer 174. Changes in optical elements of the system may be made in response to data collected. In this system, interferogram analysis reveals characteristics about the test system, through Zernike polynomials, and feedback from the computer to the optical elements provides variation.

Figure 10:
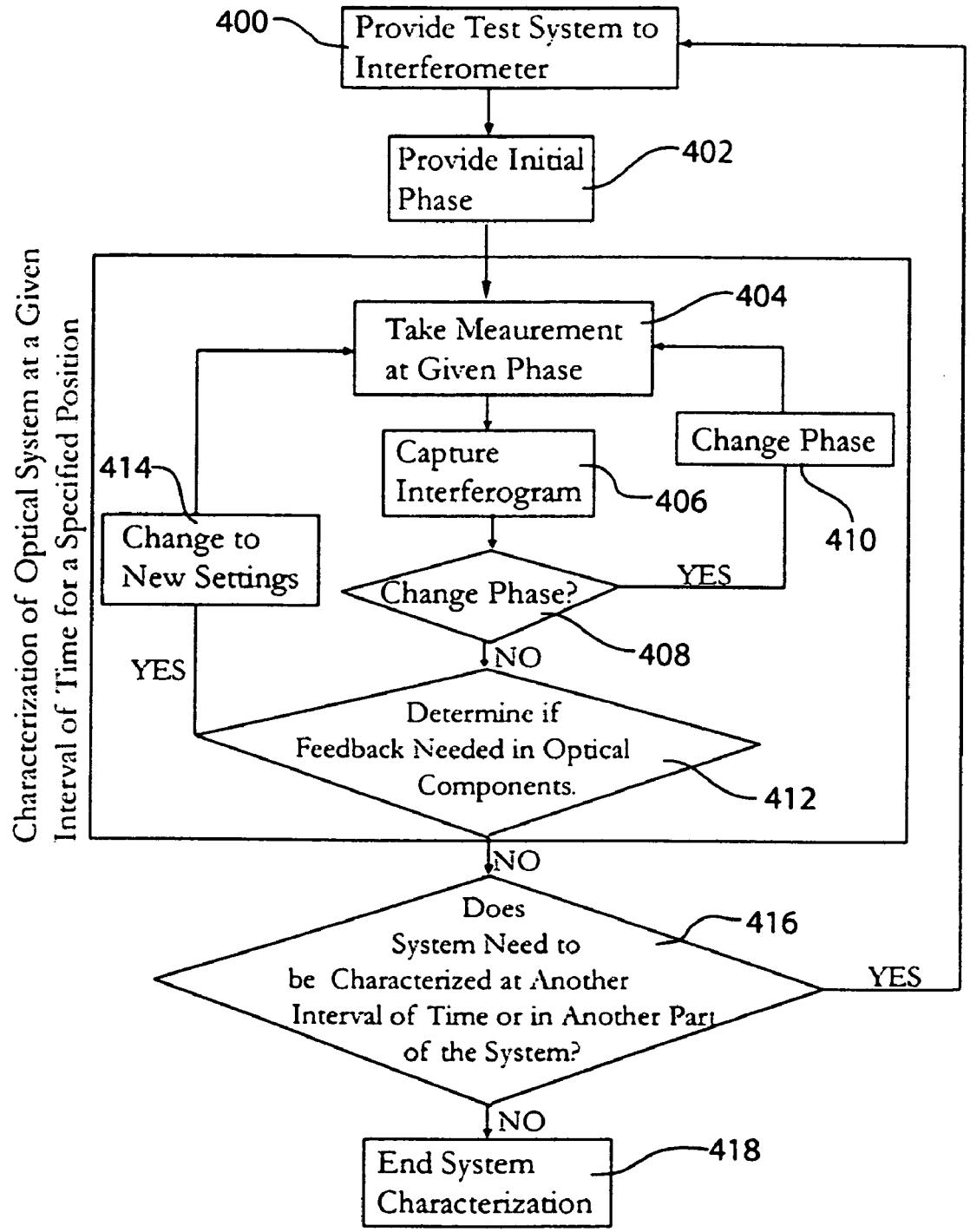
FIG. 10 is a flow chart showing the method of using the present invention to optically analyze a system under test.

Steps in practicing the invention are illustrated in the flow chart of FIG. 10. Optically sensitive test system 140 is provided to be analyzed with the interferometer of the present invention, as shown in box 400. An initial phase shift is provided to liquid crystal cell phase modulator 162, as shown in box 402. Light from light source 130 is provided to test system 140, which passes through polarization shifter with single embedded diffraction element 152, phase modulator 162, polarizer 174, and a measurement is taken on detector 178 with the given phase shift initially provided to liquid crystal cell phase modulator 162, as shown in box 404. The interferogram is captured by computer 184, as shown in box 406. The phase is changed to provide a second measurement at the new phase, as shown in boxes 408 and 410. The measurement is repeated until all desired phase changes have been made, as further shown in box 408.

If feedback is needed, optical components are adjusted under the control of computer 184, as shown in boxes 412 and 414.

The next steps are similar loops of repeated measurement at different time intervals and at different positions within the system under test, as shown in box 416. Once these measurements have all been taken the testing is complete, as shown in box 418.

While several embodiments of the invention, together with modifications thereof, have been described in detail herein and illustrated in the accompanying drawings, it will be evident that various further modifications are possible without departing from the scope of the invention. For example, the diffractive element can have various sizes, as long as it remains essentially diffractive and provides spherical waves. Nothing in the above specification is intended to limit the invention more narrowly than the appended claims. The examples given are intended only to be illustrative rather than exclusive.

What is claimed is:

1. A interferometric device, comprising:
a polarizing point diffraction plate for receiving an incident beam, said plate including a first diffractive polarizer adjacent to a second polarizer, said first polarizer for generating a reference beam and said second polarizer for generating an object beam.

2. A device as recited in claim 1, wherein said first polarizer is a polarizing film.

3. A device as recited in claim 1, wherein said second polarizer is a polarizing film.

4. A device as recited in claim 1, wherein said first polarizer is embedded in said second polarizer.

5. A device as recited in claim 1, wherein said first polarizer is circumscribed by said second polarizer.

6. A device as recited in claim 1, wherein the polarization axis of said second polarizer is oriented at 90 degrees to the polarization axis of said first polarizer.

7. A device as recited in claim 1, wherein said first and second polarizers are for generating mutually perpendicular reference and object beams.

8. A interferometric device, comprising:
an incident beam; a polarization point diffraction plate for receiving said incident beam, said plate including a first diffractive polarizer adjacent to a second polarizer and splitting said incident beam into a reference beam and an object beam; and a polarization filter for combining a portion of said reference beam and a portion of said object beam into the same polarization state.

9. A device as recited in claim 8, wherein said object beam and said reference beam travel along a common axis.

10. A device as recited in claim 8, wherein said object beam and said reference beam have mutually orthogonal polarizations.

11. A device as recited in claim 8, wherein the polarization axis of said second polarizer is oriented at 90 degrees to the polarization axis of said first polarizer.

12. A device as recited in claim 8, wherein the polarization axis of said incident beam is oriented at 45 degrees to said polarization axes of both said first and second polarizer.

13. A device as recited in claim 8, wherein said reference beam has a spherical wavefront.

14. A device as recited in claim 8, wherein said polarization filter comprises a linear polarizer.

15. A device as recited in claim 8, wherein said polarization filter is adjustable.

16. A device as recited in claim 8, further comprising a detector for imaging interferograms.

17. A device as recited in claim 8, further comprising a modulator for shifting phase of said reference beam relative to phase of said object beam.

18. A device as recited in claim 17, wherein said modulator comprises an anisotropic electro-optic material.

19. A device as recited in claim 8, further comprising means for adjusting the amount of polarization shift introduced by said polarization point diffraction plate.

20. A method of characterizing an optical wavefront with an interferometric device comprising:
transmitting a wavefront through a test system; splitting said wavefront into an object wavefront and a reference wavefront traveling along a common axis so that said object wavefront has a first intensity and first polarization and said reference wavefront has a second intensity and a second polarization; shifting the phase of said object wavefront relative to the phase of said reference wavefront; and adjusting said first intensity of said object wavefront relative to said second intensity of said reference wavefront to be in substantially the same polarization state to generate an interferogram that provides information about said wavefront.

21. A method as recited in claim 20, wherein said shifting occurs by an electro-optic device.

22. A method as recited in claim 20, wherein said splitting occurs by a point diffraction plate including a diffractive non-polarizer region adjacent to a polarizer.

23. A method as recited in claim 20, wherein said splitting occurs by a point diffraction plate including a first diffractive polarizer adjacent to second polarizer.

24. A method as recited in claim 20, wherein said splitting occurs by a point diffraction plate including a diffractive non-birefringent region adjacent to a birefringent region.

25. A method as recited in claim 20, wherein said splitting occurs by a point diffraction plate including a diffractive polarizer adjacent to a birefringent region.

26. A method as recited in claim 20, wherein said splitting occurs by a point diffraction plate including a diffractive birefringent region adjacent to a polarizer.

27. A method as recited in claim 20, wherein said splitting occurs by a point diffraction plate including a diffractive first birefringent region adjacent to a second birefringent region.

28. An interferometric measurement device for characterizing an input wavefront comprising a polarizing point-diffraction plate positioned along an optical axis of the device, wherein the plate includes two regions and one of the regions includes a first polarizing element adapted to split the input wavefront into a reference wavefront and a test wavefront with mutually orthogonal polarizations; and wherein the other of said two regions includes a second polarizing element perpendicular to the first polarizing element.

29. The interferometric measurement device of claim 28, further comprising a phase-shifting interferometer that includes a temporal phase-shifting section to impart different relative temporal phase shifts between the reference and test wavefronts, an interference section to combine the temporally phase-shifted reference and test wavefronts to produce corresponding interferograms, and a detector section to temporally sample the interferograms.

30. The interferometric measurement device of claim 28, further comprising means for changing a relative position between a source of said input wavefront and said polarizing point-diffraction plate.

31. An interferometric measurement device for characterizing an input wavefront comprising a polarizing point-diffraction plate positioned along an optical axis of the device, wherein the plate includes two regions and one of the regions includes a first polarizing element adapted to split the input wavefront into a reference wavefront and a test wavefront with mutually orthogonal polarizations; and wherein said one region is circumscribed by the other of said two regions of the plate.

32. The interferometric measurement device of claim 31, further comprising a phase-shifting interferometer that includes a temporal phase-shifting section to impart different relative temporal phase shifts between the reference and test wavefronts, an interference section to combine the temporally phase-shifted reference and test wavefronts to produce corresponding interferograms, and a detector section to temporally sample the interferograms.

33. An interferometric measurement device for characterizing an input wavefront comprising a polarization shifter positioned along an optical axis of the device, wherein the shifter includes two regions for splitting the input wavefront into a first polarized and a second polarized wavefront with mutually orthogonal polarizations, wherein one of the regions includes a means for rotating said first polarized wavefront to produce said second polarized wavefront; wherein said means for rotating the first polarized wavefront includes an output polarization element.

34. The interferometric measurement device of claim 33, further including an input polarizing element in line with said two regions to convert the input wavefront into said first polarized wavefront.

35. An interferometric measurement method for characterizing the shape of an input wavefront comprising the following steps: passing the input wavefront through a polarizing point-diffraction plate that includes two regions, one of the regions including a first polarizing element adapted to spilt the input wavefront into a reference wavefront and a test wavefront having a common optical path and mutually orthogonal polarizations; passing the reference and test wavefronts through a phase-shining interferometer maintaining said common optical path; imaging an interferogram produced by the interferometer onto a detector; and analyzing the interferogram to characterize the shape of the input wavefront wherein the other of said two regions includes a second polarizing element perpendicular to the first polarizing element.

36. The interferometric measurement method of claim 35, wherein said phase-shifting interferometer is a temporal phase-shifting interferometer.

37. An interferometric measurement method for characterizing the shape of an input wavefront comprising the following steps: passing the input wavefront through a polarizing point-diffraction plate that includes two regions, one of the regions including a first polarizing element adapted to split the input wavefront into a reference wavefront and a test wavefront having a common optical path and mutually orthogonal polarizations; passing the reference and test wavefronts through a phase-shifting interferometer maintaining said common optical path; imaging an interferogram produced by the interferometer onto a detector; and analyzing the interferogram to characterize the shape of the input wavefront; wherein said one region is circumscribed by the other of said two regions of the plate.

38. The interferometric measurement method of claim 37, wherein said phase-shifting interferometer is a temporal phase-shifting interferometer.

* * * * *